(12) United States Patent
Jakop

(10) Patent No.: US 9,849,413 B2
(45) Date of Patent: Dec. 26, 2017

(54) UPPER END CAP FOR FILTER

(71) Applicant: INGERSOLL-RAND COMPANY, Piscataway, NJ (US)

(72) Inventor: Janez Jakop, Loqatec (SI)

(73) Assignee: Ingersoll-Rand Company, Piscataway, NJ (US)

( * ) Notice: Subject to any disclaimer, the term of this patent is extended or adjusted under 35 U.S.C. 154(b) by 175 days.

(21) Appl. No.: 14/431,021

(22) PCT Filed: Oct. 10, 2013

(86) PCT No.: PCT/US2013/064399
§ 371 (c)(1),
(2) Date: Mar. 25, 2015

(87) PCT Pub. No.: WO2014/059184
PCT Pub. Date: Apr. 17, 2014

(65) Prior Publication Data
US 2015/0238887 A1    Aug. 27, 2015

Related U.S. Application Data

(60) Provisional application No. 61/712,015, filed on Oct. 10, 2012.

(51) Int. Cl.
*B01D 46/00* (2006.01)
*B01D 46/24* (2006.01)

(52) U.S. Cl.
CPC ..... *B01D 46/0004* (2013.01); *B01D 46/2414* (2013.01); *B01D 2201/291* (2013.01)

(58) Field of Classification Search
CPC ...... B01D 29/117; B01D 29/15; B01D 29/21; B01D 46/0004; B01D 46/2411;
(Continued)

(56) References Cited

U.S. PATENT DOCUMENTS 4,172,798 A    10/1979    Kronsbein
4,701,258 A    10/1987    Billiet
(Continued)

FOREIGN PATENT DOCUMENTS

CN    1139884 A    1/1997
CN    1360515 A    7/2002
(Continued)

OTHER PUBLICATIONS

State Intellectual Property Office of the Peoples Republic of China, Search Report, Chinese Patent Application No. 2013800528321, Search completed Feb. 15, 2016.
(Continued)

*Primary Examiner* — Robert Clemente
(74) *Attorney, Agent, or Firm* — IpHorgan Ltd.

(57) ABSTRACT

An end cap is provided for use in a filter element. The end cap includes a first side providing a first head connection which corresponds to a connection of a first filter head and a first media connection which corresponds to a connection of a filter media. The end cap further includes a second side providing a second head connection which corresponds to a connection of a second filter head, the second connection is configured differently from the first connection, and a second media connection which corresponds to a connection of a filter media. A support is provided for being received by a filter body, wherein the first side may be coupled to a first filter head and the second side may be attached to one end of a filter media or alternatively, the second side may be coupled to a second filter head and the first side may be attached to one end of a filter media.

11 Claims, 3 Drawing Sheets

(58) Field of Classification Search
CPC .......... B01D 46/2414; B01D 2201/291; B01D 2201/295; B01D 2201/301; B01D 2201/302; B01D 46/0005; B01D 2201/296

See application file for complete search history.

(56) References Cited

U.S. PATENT DOCUMENTS

| | | |
|---|---|---|
| 5,053,129 A | 10/1991 | Kitson |
| 5,580,456 A | 12/1996 | Bowlsbey |
| 5,693,109 A | 12/1997 | Coulonvaux |
| 6,015,492 A | 1/2000 | Popoff |
| 6,391,197 B1 | 5/2002 | Billiet |
| 6,409,786 B1 | 6/2002 | Wright |
| 6,440,201 B1 | 8/2002 | Billiet |
| 6,461,397 B1 | 10/2002 | Billiet |
| 6,599,342 B2 | 7/2003 | Andress et al. |
| 6,663,685 B2 | 12/2003 | Wright |
| 6,692,639 B1 | 2/2004 | Spearman |
| D497,972 S | 11/2004 | Reynolds |
| 6,936,084 B2 | 8/2005 | Schlensker |
| 7,344,581 B2 | 3/2008 | Pearson |
| 7,442,220 B2 | 10/2008 | Pearson |
| 7,445,651 B2 | 11/2008 | Lane |
| 7,503,952 B2 | 3/2009 | Lane |
| 7,766,989 B2 | 8/2010 | Lane |
| 7,833,304 B2 | 11/2010 | Pearson |
| 7,857,970 B2 | 12/2010 | Wright |
| 7,964,010 B2 | 6/2011 | Lane |
| 7,964,011 B2 | 6/2011 | DeLillo |
| 8,002,865 B2 | 8/2011 | Lane |
| 2008/0250765 A1 | 10/2008 | Lane |
| 2009/0127184 A1 | 5/2009 | Pauwels |
| 2010/0089813 A1 | 4/2010 | Tellier |
| 2010/0154371 A1 | 6/2010 | Bittle |
| 2011/0049035 A1 | 3/2011 | Wise |
| 2011/0100893 A1 | 5/2011 | Kocksch |

FOREIGN PATENT DOCUMENTS

| | | |
|---|---|---|
| CN | 202036885 U | 11/2011 |
| DE | 10052524 A1 | 4/2002 |
| EP | 2188032 B2 | 5/2001 |
| EP | 1343574 B1 | 10/2004 |
| EP | 1870152 A1 | 12/2007 |
| EP | 1967247 A1 | 9/2008 |
| EP | 1804954 B2 | 6/2010 |
| EP | 2188032 B1 | 5/2011 |
| NL | 2004925 | 12/2011 |
| WO | 1999037386 A1 | 7/1999 |
| WO | 2009012010 A1 | 1/2009 |

OTHER PUBLICATIONS

European Patent Office, International Search Report and Written Opinion, PCT/US2013/064399, dated Jan. 3, 2014.

The International Bureau of WIPO, International Preliminary Report on Patentability, Chapter I, PCT/US2013/064399, dated Apr. 15, 2015.

UPPER END CAP FOR FILTER

CROSS-REFERENCE TO RELATED APPLICATIONS

This application is a national phase application of international application no. PCT/US2013/064399, filed Oct. 10, 2013, which claims the benefit of U.S. provisional application No. 61/712,015, filed Oct. 10, 2012, the entire contents of which both are hereby incorporated by reference.

FIELD OF THE INVENTION

The present invention relates to a filter element for a filter, and in particular, an upper end cap for a filter element.

BACKGROUND OF THE INVENTION

The prior art includes general air treatment technology, such as compressed air filters, dust filters, general purpose filters, coalescing filters and activated carbon filters. The compressed air filters may include a filter body containing a filter element which couples to a filter head. The filter head typically includes the fittings for connecting the filter into a compressed air system. The filter element requires periodic replacement to maintain the performance of the compressed air system. In particular, a standard schedule for filter element replacement significantly lowers the pressure drop loss across the compressed air system.

To accommodate ease in replacement of the filter element, the fittings for coupling to the compressed air system are generally limited to the filter head. The filter body contains the filter element and, with the exception of the drain, includes no attachments to the compressed air system. Thus, the filter body is designed for easy removal from the compressed air system together with the filter element for easy replacement of the filter element.

The prior art filter heads include various different configurations, including the ports, chamber and interface to the filter element and filter body. Each style of configuration of filter head requires a filter body and filter element with a corresponding configuration in order to provide a sealed filter with optimum flow characteristics.

The main problem with the prior art is the required manufacturing of each component part and the corresponding inventory required for each part, to support the assembly of the various systems.

SUMMARY OF THE INVENTION

It is an object of the present invention to provide and accommodate various style and size filter elements and yet reduce the overall component count.

It is a further object of the present invention to reduce the inventory of filter components.

It is still a further object of the present invention to provide an end cap for a filter element which may be used for more than one style filter element.

The present invention therefore provides an end cap for use in a filter element. The end cap includes a first side providing a first head connection which corresponds to a connection of a first filter head and a first media connection which corresponds to a connection of a filter media. The end cap also includes a second side providing a second head connection which corresponds to a connection of a second filter head, the second connection is configured differently from the first connection, and a second media connection which corresponds to a connection of a filter media. The end cap includes a support for being received by a filter body, wherein the first side may be coupled to a first filter head and the second side may be attached to one end of a filter media or alternatively, the second side may be coupled to a second filter head and the first side may be attached to one end of a filter media.

The end cap is adaptable for coupling to one end of a filter media, with the other end of the filter media being coupled to a lower end cap, thus forming the filter media. The assembled filter media may be inserted into a filter body and then coupled to a filter head.

The first and second side of the end cap may each be configured to couple to the same size and style of filter element or alternatively to different size and style filter element. In addition, both sides of the support may be configured to couple to the same size and style of filter body regardless of which side of the end cap is used for coupling to the filter body. Alternatively, the support may provide a different configuration on one side from the other side, in order to allow the end cap to be used for coupling to different size and style filter body.

Considering the above comments, it will be appreciated that with an inventory of a single upper end cap, a single lower end cap and a single filter media, the inventory will accommodate the assembly of one of either of two style filter elements accommodating two different size and style filter heads, and wherein the corresponding filter body may be the same or different size and style, depending on the configuration of the support.

It will be appreciated that the inventory will accommodate a greater range of compressed air filter systems, where the inventory includes multiple filter elements of different style and size, multiple upper end caps of different style and size, as well as multiple lower end caps of different style and size.

DETAILED DESCRIPTION OF THE INVENTION

Figure 1:
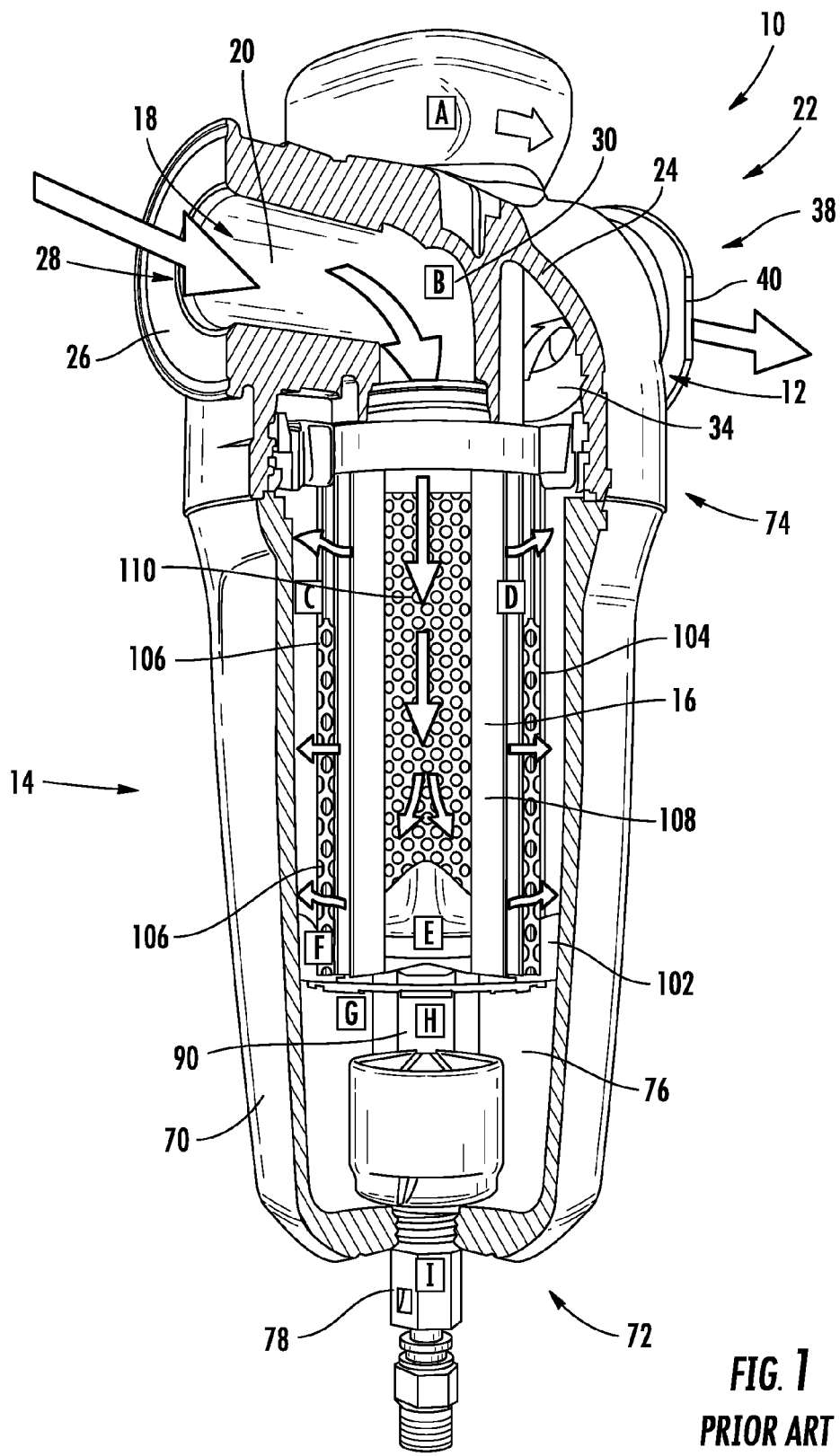
FIG. 1 is a part perspective view and part cross-sectional view of a prior art compressed air filter.
Figure 2:
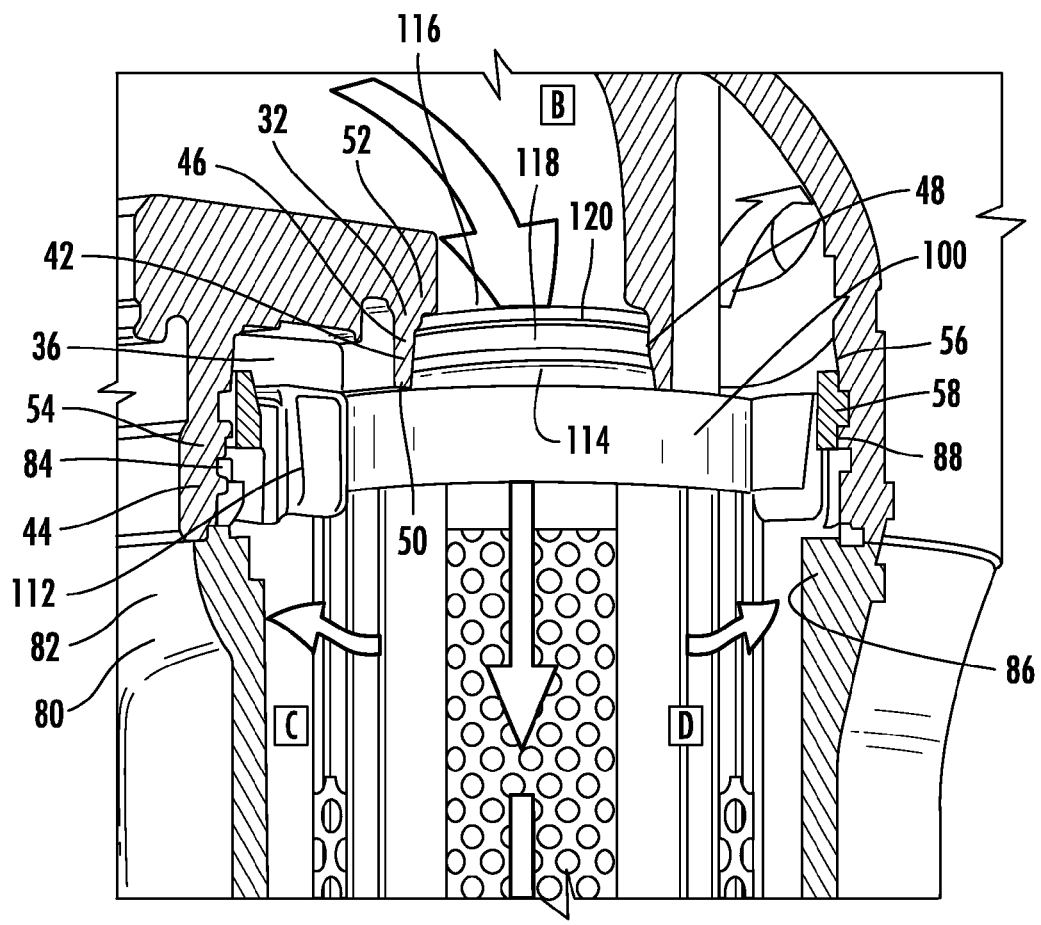
FIG. 2 is an enlarged view of a portion of the prior art compressed air filter of FIG. 1.

FIGS. 1 and 2 show a prior art compressed air filter 10. The compressed air filter 10 includes a filter head 12, a filter body 14 and a filter element 16. The filter head 12 includes an inlet passage 18 formed by an inlet wall 20 and an outlet passage 22 formed by an outlet wall 24. The inlet passage 18 includes a first end 26 in fluid communication with an inlet port 28 and a second end 30 in fluid communication with a first filter element port 32 (FIG. 2). The outlet passage 22 includes a first end 34 in fluid communication with a second filter element port 36 (FIG. 2) and a second end 38 in fluid communication with an outlet port 40.

The filter head 12 further includes a filter element connector 42 and a filter body connector 44. The filter element connector 42 includes a first cylindrical collar 46 which forms the first filter element port 32. The first cylindrical collar 46 extends downward from the filter head 12 and includes an inner cylindrical wall 48 and a lower annular edge 50. A first abutement or stop 52 is provided at an upper end of the inner cylindrical wall 48. The first cylindrical collar 46 includes an outside diameter, an inside diameter, and a length between the stop 52 and lower annular edge 50. The filter body connector 44 includes a second cylindrical collar 54 having an inside diameter which is larger than an outside diameter of the first cylindrical collar 46. The second cylindrical collar 54 includes an internal wall 56 having a thread 58. The second filter element port 36 is generally annularly shaped and is formed between the first cylindrical collar 46 and the second cylindrical collar 54.

The filter body 14 includes a generally cylindrical body 70 having a closed lower end 72 and an open upper end 74 which define a cavity 76. The closed end 72 includes a drain line 78. The upper end 74 includes an annular collar 80 having an outer wall 82 with a thread 84 and an inner wall 86 with a ledge 88. Vertical ribs 90 are formed within the cavity 76 of the cylindrical body 70 at the closed lower end 72.

The filter element 16 includes an upper end cap 100 and a lower end cap 102. The end caps 100, 102 may be made of nylon or another material. A cylindrical mesh wall 104 extends between the upper end cap 100 and the lower end cap 102. The cylindrical mesh wall 104 includes a plurality of openings 106. A cylindrical filter media 108 is enclosed within the end caps 100, 102 and cylindrical mesh wall 104. The filter media 108 forms an inner cylindrical fluid channel 110 between the upper end cap 100 and the openings 106 in the cylindrical mesh wall 104. Radial extensions 112 extend outwardly from the upper end cap 100. A collar 114 extends upward from the upper end cap 100. The collar 114 includes an upper edge 116 and an outer wall 118, the outer wall 118 provided with two o-rings 120. The collar 114 includes an outer diameter, and inner diameter and the outer wall 118 includes a length.

The prior art compressed air filter 10 is assembled by inserting the filter element 16 into filter body 14. The lower end cap 102 will abut the vertical ribs 90 and the radial extensions 112 will abut the ledge 88. The combination filter body 14 and filter element 16 is then inserted into the filter head 12 and threaded into place with the threads 84 of the filter body 14 engaging the threads 58 of the filter head 12. The advancement of the filter body 14 and filter element 16 into the filter head 12 will be stopped by full engagement of the threads 84, 58 and the upper edge 116 with the first abatement 52, and the lower annular edge 50 with the upper end cap 100.

Figure 3:
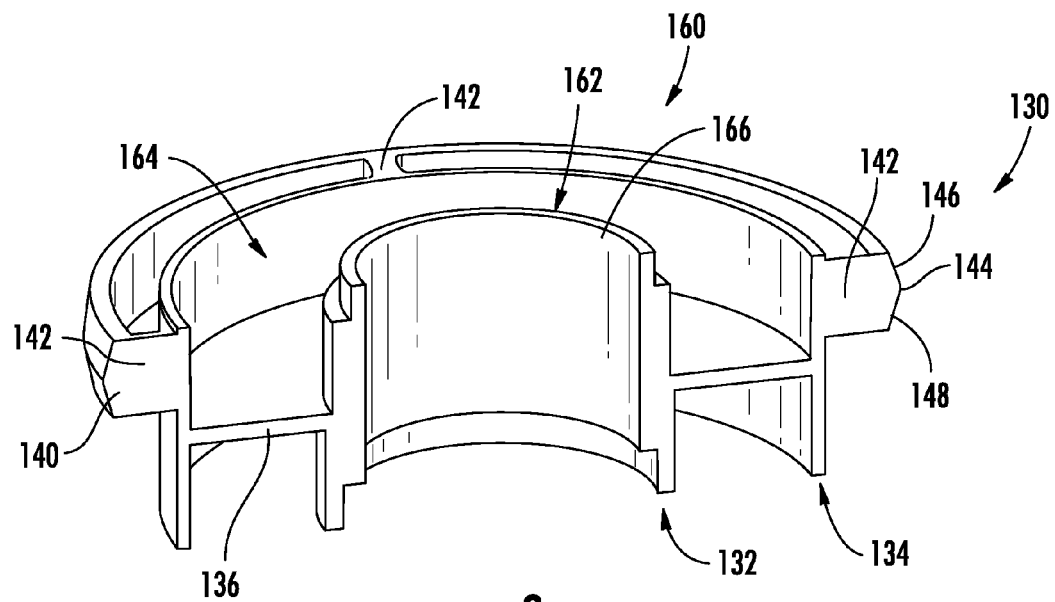
FIG. 3 is a cross-sectional perspective view of an end cap in accordance with the present invention.

FIG. 3 shows an upper end cap 130 in accordance with the present invention. The upper end cap 130 includes an inner collar 132 and an outer collar 134. The inner collar 132 and the outer collar 134 are connected via an inner web 136. The inner web 136 extends continuously between the inner collar 132 and outer collar 134. A rim 140 surrounds the outer collar 134 and is connected to the outer collar 134 via a plurality of outer wedges or bridges 142. The rim 140 includes a ridge 144 defined by a pair of converging first and second slanted surfaces 146, 148.

The upper end cap 130 in FIG. 3 presents a first connection 160. The first connection 160 includes the upper end 162 of the inner collar 132 which includes a continuous inner diameter, an outer diameter, and a step 164 which provides a reduced outer diameter having a length. The inner collar 132 includes a length extending from the inner web 136 to an upper annular edge 166. The first connection 160 is intended for coupling to the filter element connector 42 of a first filter head 12 having a first connection with dimensions which correspond to the first connection 160 of the upper end cap 130. Thus, a fluid flow channel extends from the inlet port 28 to the inner cylindrical fluid channel 110 within the filter element 16.

With the upper end cap 130 in the orientation of FIG. 3, the slanted surface 148 of the rim 140 is adaptable to be received by an annular beveled surface (not shown) of the filter body 14.

Figure 4:
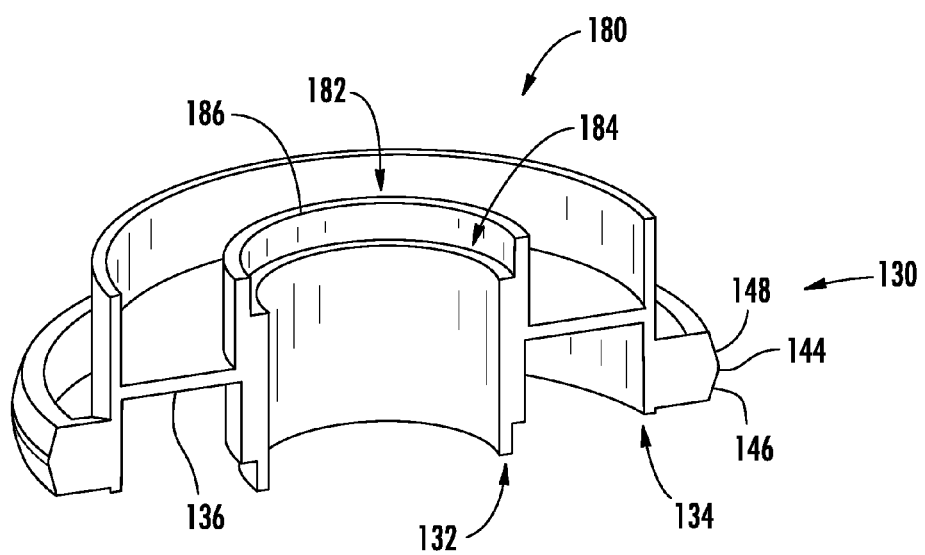
FIG. 4 is a cross-sectional perspective view of the end cap of FIG. 2, but inverted, in accordance with the present invention.

FIG. 4 shows the upper end cap 130 of FIG. 3, in accordance with the present invention, but inverted from that shown in FIG. 3.

The upper end cap 130 in FIG. 4 presents a second connection 180. The second connection 180 includes the upper end 182 of the inner collar 132 which includes the continuous inner diameter and a step 184 which provides an increased inner diameter extending from the step 184 to the upper annular edge 186, and an outer diameter. The inner collar 132 includes a length which extends from the inner web 136 to the upper annular edge 186. The second connection 180 is intended for coupling to the filter element connector 42 of a second filter head 12 having a second connection with dimensions which correspond to the second connection 180 of the upper end cap 130. Thus, a fluid flow channel extends from the inlet port 28 to the inner cylindrical fluid channel 110 within the filter element 16.

With the upper end cap 130 in the orientation of FIG. 4, the slanted surface 146 of the rim 140 is adaptable to be received by the annular beveled surface (not shown) of the filter body 14.

It should also be appreciated that the respective lower portion of the upper end cap 130 as shown in each of FIGS. 3 and 4 is adaptable for coupling to the cylindrical mesh wall 104 and the cylindrical filter media 108 in a manner similar to the upper end cap 100 of FIG. 1.

While the present invention has been described in connection with a specific application, this application is exemplary in nature and is not intended to be limiting on the possible applications of this invention. It will be understood that modifications and variations may be effected without departing from the spirit and scope of the present invention. It will be appreciated that the present disclosure is intended as an exemplification of the invention and is not intended to limit the invention to the specific embodiments illustrated and described. The disclosure is intended to cover, by the appended claims, all such modifications as fall within the scope of the claims.

I claim:

1. An end cap for use in a filter element, the end cap comprising: a first side (160) providing a first head connection (162) which corresponds to a connection of a first filter head (12) and includes a first annular wall and a first media connection (132, 134) which corresponds to a connection of a filter media (108) and includes the first annular wall and a second annular wall concentric to and outside of the first annular wall; a second side (180) providing a second head connection (182) which corresponds to a connection of a second filter head and includes a third annular wall, the second head connection is configured differently from the first head connection, and a second media connection (132, 134) which corresponds to a connection of a filter media (108) and includes the third annular wall and a fourth annular wall concentric to and outside the third annular wall; and a support (140) for being received by a filter body (14), wherein a portion (134) of the support (140) may be coupled to a first filter head (12) and attached to one end of a filter media (108), wherein the first and third annular walls define an inner collar (132) and the second and fourth annular walls define an outer collar (134), and wherein a central fluid flow channel is formed by the inner collar (132) and a peripheral fluid flow channel is formed between the outer collar (134) and the support (140).

2. The end cap of claim 1, wherein the first media connection (132, 134) and the second media connection (132, 134) correspond to a connection of a first filter media (108).

3. The end cap of claim 1, wherein the first media connection (132, 134) is different than the second media connection (132, 134), and the first media connection (132, 134) correspond to a connection of a first filter media (108) and the second media connection (132, 134) correspond to a connection of a second filter media.

4. The end cap of claim 1, wherein the support (140) as viewed from the first side (160) of the end cap (130) is a mirror image of the support (140) as viewed from the second side (180) of the end cap (130), whereby either of the first side (160) or second side (180) may be received by a first filter body (14).

5. The end cap of claim 1, wherein the support (140) includes a first body support (146) on the first side (160) of the end cap (130) and a second body support (148) on the second side (180) of the end cap (130), the first body support (146) is different from the second body support (148), whereby the first body support (146) is adaptable to be received by a first filter body (14) and the second body support (148) is adaptable to be received by a second filter body.

6. The end cap of claim 1, further comprising an inner web (136) which couples the inner collar (132) and the outer collar (134); wherein the support (140) includes a rim (140) which extends about and is spaced from the outer collar (134) and one or more bridges (142) which connect the rim (140) to the outer collar (134); and wherein the peripheral fluid flow channel is formed between the outer collar (134) and the rim (140).

7. The end cap of claim 1, wherein the support (140) includes a rim (140) formed by a first and second converging slanted surfaces (146, 148) which meet and form an annular ridge (144).

8. The end cap of claim 1, wherein the support (140) includes a plurality of extensions (112) which extend radially from the end cap (130).

9. An end cap for use in a filter element, the end cap comprising: a first side (160) providing a first head connection (162) which corresponds to a connection of a first filter head (12) and a first media connection (132, 134) which corresponds to a connection of a filter media (108); a second side (180) providing a second head connection (182) which corresponds to a connection of a second filter head, the second connection is configured differently from the first connection, and a second media connection (132, 134) which corresponds to a connection of a filter media (108); a support (140) for being received by a filter body (14), wherein a portion (134) of the support (140) may be coupled to a first filter head (12) and attached to one end of a filter media (108); an inner collar (132) which forms a central fluid flow channel (110); an outer collar (134); an inner web (136) which couples the inner collar (132) and the outer collar (134); a rim (140) which extends about and is spaced from the outer collar (134) and forms a peripheral fluid flow channel between the outer collar (134) and the rim (140); and one of more bridges (142) which connect the rim (140) to the outer collar (134); wherein the inner collar (132) includes a first inner diameter, a first outer diameter, and a first annular edge (166) on the first side (160), a second inner diameter, a second outer diameter, and a second annular edge (186) on the second side (180), an inner step (184) separates the first and second inner diameters and an outer step (164) separates the first and second outer diameters.

10. The end cap of claim 9, wherein the inner collar (132) includes a peripheral groove extending about an outer surface, and an o-ring (120) is received by the peripheral groove.

11. The end cap of claim 9, wherein the inner collar (132) includes a threaded portion.

\* \* \* \* \*